United States Patent Office 3,203,503
Patented Aug. 31, 1965

3,203,503
TREE WORKING MACHINE
Roy J. Smith and Daniel T. Seamount, Riverside, and David W. Murphy, Garden Grove, Calif., assignors to The Regents of the University of California, Berkeley, Calif.
Filed Feb. 18, 1964, Ser. No. 345,679
6 Claims. (Cl. 182—2)

This invention relates to a tree working machine for facilitating various operations on trees such as pruning or fruit picking.

Various types of apparatus for supporting and positioning a tree worker are well known in the art. Many of these structures constitute traveling vehicles incorporating cantilevered boom structures carrying a seat for the worker. The arrangement is such that the vehicle may travel down a path parallel to a row of trees with the cantilevered structure suitably adjusted for maximum convenience to the worker in pruning or removing fruit from the tree.

In an actual fruit picking operation, the vehicle is stopped adjacent to a tree and the cantilevered structure positioned to dispose the fruit picker at a convenient level so that fruit may be removed from a given area of the tree. For any one set position of the vehicle and supporting structure, however, the area of the tree from which fruit may be removed is generally limited to the reach of the fruit picker.

The present invention has as its primary object the provision of a vastly improved apparatus for positioning a worker at various locations to facilitate tree working operations such as the picking of fruit from given areas of the tree, in which the "reach" of the worker for any one area is effectively increased without necessitating repositioning of the boom structure or vehicle. As a consequence in the case of fruit picking, more fruit may be picked for any initially set position of the overall vehicle structure and thus the rate of picking over an extended period of time can be greatly increased.

More particularly, it is an object of this invention to provide an improved apparatus incorporating a novel swing seat structure for supporting a worker in a convenient position for picking fruit in which his position may be automatically shifted in response to movements by the worker himself without having to change the basic positions of the vehicle and cantilevering boom structure suspending the seat.

A more general object of this invention is to provide a novel suspension support seat for a person in which he may position himself and the seat through a limited range by simply leaning in the direction in which he wishes to move.

Other objects are to provide an improved apparatus for facilitating the picking of fruit in which many more positions of a supporting seat for the picker may be realized than has been possible heretofore for any given set position of the vehicle. These positions extend in lateral and fore and aft planes, and may include rotational positions. In addition, the picker may adjust his level above the ground to the end that he can readily position himself to pick the maximum amount of fruit for a given position of the supporting vehicle.

Briefly, these and many other objects and advantages of this invention are achieved by providing a basic frame and boom structure adapted to travel along a path parallel to a row of fruit trees from which fruit is to be picked. A carriage is mounted to the boom structure for movement therealong, so that its level above the ground may be changed. A seat structure for the picker in turn is suspended from the carriage by means of a unique suspension and control means.

The suspension and control means for the seat constitutes an important feature of the present invention. The suspension and control means is designed such that the fruit picker in the seat may effect a swinging or lateral movement of the seat simply by shifting his center of gravity in the direction in which he wishes to travel. Similarly, limited forward and rearward movement of the seat can be effected by the picker. Finally, auxiliary supports may be provided enabling swinging movement of the suspension about a horizontal axis and rotative movement of the suspension about a vertical axis.

With the foregoing arrangement, the frame structure itself may be positioned periodically along the path paralleling the row of trees. The boom structure may then be properly positioned to locate the picker in a central location relative to the tree. As a consequence of the swing features of the suspension and control system, the seat will be translated in response to the picker shifting his center of gravity and fruit may thus be removed from a relatively large area of the tree without the necessity of changing the boom position or the position of the vehicle. After a given area has been picked, the boom itself may be repositioned and/or the seat and carriage structure moved along the boom to locate the picker adjacent to an unpicked area. The subsequent movements required to cover this new area may then be automatically effected by the picker himself.

It will thus be evident that the minimization of the number of vehicle stops and the number of movements of the basic boom structure will enable a far larger quantity of fruit to be picked in a given unit of time than has been possible heretofore.

A better understanding of the invention will be had by now referring to one embodiment thereof as illustrated in the accompanying drawings, in which:

FIGURE 1 is a perspective view of the apparatus of this invention;

FIGURE 2 is a greatly enlarged fragmentary view of the swing seat portion of the apparatus for supporting the picker looking generally in the direction of arrow 2 of FIGURE 1;

FIGURE 3 is a cross-section taken in the direction of the arrows 3—3 of FIGURE 2; and FIGURE 4 is another cross-section taken in the direction of the arrows 4—4 of FIGURE 2.

Referring first to FIGURE 1, there is shown a frame structure 10 which may be provided with fore and aft wheels 11 and 12 to enable the frame structure to move along a path parallel to a row of trees as illustrated by the arrow. The frame structure may be towed by a tractor or may be provided with its own motive means.

The frame structure 10 includes a transverse support means 13 mounting swivel wheels 14 and 15. This transverse structure in turn supports boom members comprising rails 16 and 17 arranged for swinging movement about a lower cross rod 18. The upper ends of the rails terminate in an upper cross rod 19 to which cables 20 and 21 are secured to enable the angle of inclination of the boom rails 16 and 17 to be varied as indicated by the arcuate double-headed arrow. As shown, there are provided stabilizing gantry members 22 and 23 supporting the cables 20 and 21 at their upper ends.

A carriage means 24 is arranged to ride longitudinally along the boom rails 16 and 17 so that its level above the ground may be varied as by cables 24a and 24b. A seat 25 for supporting a fruit picker in turn is suspended from the carriage 24 by a unique suspension and control means which will be described in detail subsequently. As shown, there may be provided a funnel shaped receiving basket 26 in the front portion of the seat adapted to be straddled by the picker's legs so that he will have a convenient place to drop fruit picked from the trees. Fruit received in the funnel 26 may be passed through suitable flexible conduits (not shown) to storage baskets such as indicated at 27 carried on the rear portion of the frame 10.

From the description of the components thus far, it will be clear that a picker seated in the seat structure 25 may be positioned adjacent to a given area on a tree by initially moving the entire vehicle frame structure 10 to a position juxtaposed to the tree and then suitably adjusting the angle of the boom members 16 and 17. Thereafter, the carriage means 24 may be moved up and down the boom members to further adjust the location of the fruit picker.

In accordance with an important feature of this invention, the seat structure 25 is suspended and controlled in a unique manner from the carriage means 24 such that the seat may move in fore and aft and lateral directions so that the "reach" of the picker is extended without requiring further adjustments of the boom and carriage to cover a given area. This unique suspension and control system is illustrated in detail in FIGURES 2 and 3.

As shown, the carriage 24 includes frame rods 28 and 29 terminating in a horizontal bearing 30. A C-shaped shaft 31 in turn is secured to the horizontal bearing 30 by means of a vertical bearing 32. An upper spacing means in the form of a sprocket wheel 33 is secured to the shaft 31 as shown. By this arrangement, the shaft 31 and wheel 33 may rotate about a vertical axis V and simultaneously swing in a fore and aft direction about a horizontal axis H.

A depending post member 34 is journaled about the shaft 31 at its upper end and about a lower shaft 35 at its lower end as best shown in FIGURE 4. The shaft 35 is rigidly secured to a lower spacing means in the form of a sprocket wheel 36. The sprocket wheel 36 is of lesser diameter than the sprocket wheel 33.

The seat structure for the picker includes a seat 37 provided with a back rest 38 mounted on a vertical post 39 secured to the shaft 35. The seat 37 is adapted to rotate on the post 39 through a bearing 40. Also secured to the shaft 35 is a foot rest structure 41 for the picker's feet.

The suspension and control means is completed by a pair of control members forming the opposite sides of a sprocket chain 42 as indicated at 42a and 42b passing about the upper and lower sprocket wheels 33 and 36.

It should be understood that the upper sprocket wheel 33 is rotationally held stationary with respect to the shaft 31, the upper end of the post 34 simply being capable of swinging through a small arc about the shaft 31. The lower sprocket wheel 36 similarly is rotatively stationary with respect to the shaft 35 and foot structure so that rotation of the sprocket whel 36 will result in a tipping movement of the seat and foot structure.

With the foregoing description of the components in mind, the operation of the swing seat structure will be clear. If C represents the center of gravity of a picker seated on the seat 37, the seat structure will assume a central position as shown in solid lines in FIGURE 2 when the picker himself is seated centrally in the seat. If now the picker wishes to reach some fruit on his right, he need only shift his center of gravity by swivelling or leaning to the right. Offsetting of the center of gravity from the vertical axis V will then result in a torque being applied to the lower sprocket wheel 36 resulting in a tipping of the chair and providing a side motion. This tipping of the seat is a direct consequence of the diameter of the lower sprocket wheel 36 being less than that of the upper sprocket wheel 33 and constitutes an important feature of this invention.

The degree of movement towards the dotted line position illustrated in FIGURE 2 will be function of the degree of leaning on the part of the picker. If a fruit is relatively far out to his right side, he will have a natural tendency to lean a considerable extent which will automatically result in the seat structure swinging towards the direction in which he is leaning. A center position may be readily resumed simply by the picker sitting in a central straight position to return the center of gravity C from the position C' to a position generally in alignment with the vertical axis V.

Swinging movement to the left is accomplished by the picker leaning in the other direction or to his left.

As a consequence of the horizontal bearing about the axis H, the swing seat will remain suspended vertically when the inclination of the boom is changed.

It should be understood that the principles of the swing seat are based upon the provision of a pair of control members, the upper ends of which are spaced further apart than the lower ends. This difference in spacing is defiined by the different diameters of the sprocket wheels to result in a physical tipping of the seat when the same is swung from one side to the other. If the sprocket wheels were of the same diameters, the seat 37 would tend to stay level and a desired torque on the lower sprocket of suffcient magnitude to effect a swing could not easily be realized.

In conjunction with the difference in diameters of the sprocket wheels, it should be noted that the foot rest 41 permits the picker to shift his center of gravity a greater extent by exerting pressure on the foot rest with his feet. This action is facilitated by having the seat itself swivel about its vertical post 39 as indicated in the dotted lines in FIGURE 2.

In FIGURE 2, the locus of movement of the lower portion of the post will be a circular arc such as indicated at 43. The locus of movement of the picker's center of gravity on the other hand will follow a more or less parabolic curve as indicated at 44 which is lower from the circular arc 43 on each side of the center position. This different locus for the center of gravity is again a consequence of the tipping feature of the seat.

In the overall operation of the entire apparatus, the vehicle 10 is first positioned adjacent one of the trees in a row and the boom rails 16 and 17 suitably adjusted with respect to the fruit on the tree to be picked. The carriage carrying the swing seat structure may then be raised along the boom rails 16 and 17 to position the picker or worker at a convenient location for picking fruit over a certain area on the tree. This fruit may be very rapidly picked as a consequence of the swing seat features wherein the worker can cover a relatively large area laterally. As a consequence of the vertical pivot 30, the entire plane of lateral swinging movement of the picker in the swing seat arrangement may be shifted so that the side portions of the tree may have the fruit removed therefrom without having to effect further movements of the overall vehicle. This rotation about the vertical axis corresponding with the axis of the post 34 would normally take place in combination with an upward sliding movement of the carriage means along the boom rails 16 and 17 so that a higher side portion of the tree would be presented for picking.

Various controls for moving the boom and carriage are preferably operated directly by the picker from his seat so that minimum time is involved in repositioning of the seat.

After the fruit from one tree has been picked and the products collected in the funnel arrangement, the frame structure is moved on to a position juxtaposed the next tree.

It will be evident from the foregoing that great efficiency may be realized by means of the novel suspension and control system and boom structure of this invention. Not only can relatively large areas of a tree have the fruit removed therefrom without having to move the entire vehicle frame 10, but the avoidance of several different adjustments of the major components results in a less time consuming operation, the response of the swing seat being wholly automatic in response to the natural tendency for the picker to move or lean in one direction or the other when reaching for fruit.

Moreover, the combination of the boom with the swing seat suspended vertically therefrom permits the seat to be positioned well within the tree. This positioning is achieved by having the boom extend over the top of the tree and the seat lowered into the branches. Since the tree branches extend generally radially from the tree trunk, the boom is not necessarily parallel to all branches and thus the only way access could be provided to interior portions of the tree is by means of the suspension system as described.

While only one particular embodiment of the apparatus has been set forth and described, various changes and modifications that fall clearly within the scope and spirit of this invention will occur to those skilled in the art. The supporting apparatus for facilitating the picking of fruit is therefore not to be thought of as limited to the one embodiment set forth merely for illustrative purposes.

What is claimed is:

1. A supporting apparatus for tree workers, including: a frame structure positionable above the ground; a seat structure for said worker; a suspension and control means for suspending and controlling said seat, said control means including a pair of control members coupled at upper horizontally spaced points to said frame structure at their upper ends and to lower horizontally spaced points on said seat structure at their lower ends, the spacing between the lower ends of said control members being less than the spacing between the upper ends thereof, whereby leaning of said worker to one side of said seat structure tips said seat structure and causes said seat structure to swing in the direction in which said worker leans.

2. An apparatus according to claim 1, in which said control members are defined by two sides of a sprocket chain and in which there are provided upper and lower sprocket wheels fixed to said frame structure and seat respectively about which said sprocket chain passes, the diameter of said lower sprocket wheel being less than the diameter of said upper sprocket wheel to define said lower and upper horizontally spaced points respectively.

3. An apparatus for facilitating the working of trees comprising, in combination: a frame structure adapted to move along a path in a given direction adjacent to said trees; boom means carried by said frame structure extending above the ground towards said trees; a carriage means mounted for movement along said boom means; a seat for holding a worker; and suspension means suspending said seat from said carriage whereby said seat can swing in a first vertical plane parallel to said given direction, said suspension means being coupled to said carriage means for rotation about a vertical axis and said seat being coupled to the lower end of said suspension means for rotation about a vertical axis parallel to said first mentioned vertical axis independently of rotation of said suspension means.

4. An apparatus according to claim 3, including first and second control members; upper spacing means carried by said suspension means and coupled to upper portions of said control members to hold them separated a first given distance in said first vertical plane; a lower spacing means coupled to the lower portions of said control members to hold them separated a second given distance less than said first given distance, said seat being secured to said lower spacing means whereby shifting of the center of gravity of said worker to one side of said seat tips said seat to effect a swinging movement of said seat in said first vertical plane in the direction in which said center of gravity is shifted.

5. An apparatus according to claim 4, in which said upper spacing means comprises a sprocket wheel of diameter equal to said first given distance, said lower spacing means comprising a sprocket wheel of diameter equal to said second given distance, and in which said control members are defined by the two sides of a sprocket chain means passing about said upper and lower sprocket wheels, said upper sprocket wheel being locked against rotation about its own axis and said lower sprocket wheel being secured for rotation with said seat so that tipping of said seat exerts a rotative torque on said lower sprocket wheel to effect said swinging movement.

6. An apparatus according to claim 5, in which said suspension means comprises a post extending between said upper and lower sprocket wheels and defining upper and lower journals therefor so that said post defines a fixed vertical spacing therebetween.

References Cited by the Examiner

UNITED STATES PATENTS 2,433,859  1/48  McCormick _____ 297—277 X
2,754,087  7/56  Johnson _____ 182—2 X
2,821,312  1/58  Wiegel _____ 182—2

HARRISON R. MOSELEY, *Primary Examiner.*

REINALDO P. MACHADO, *Examiner.*